July 10, 1923.
V. E. SCHMIEDEKNECHT
WARE MOLDING APPARATUS AND PROCESS
Filed Oct. 13, 1922     7 Sheets-Sheet 1
1,461,563
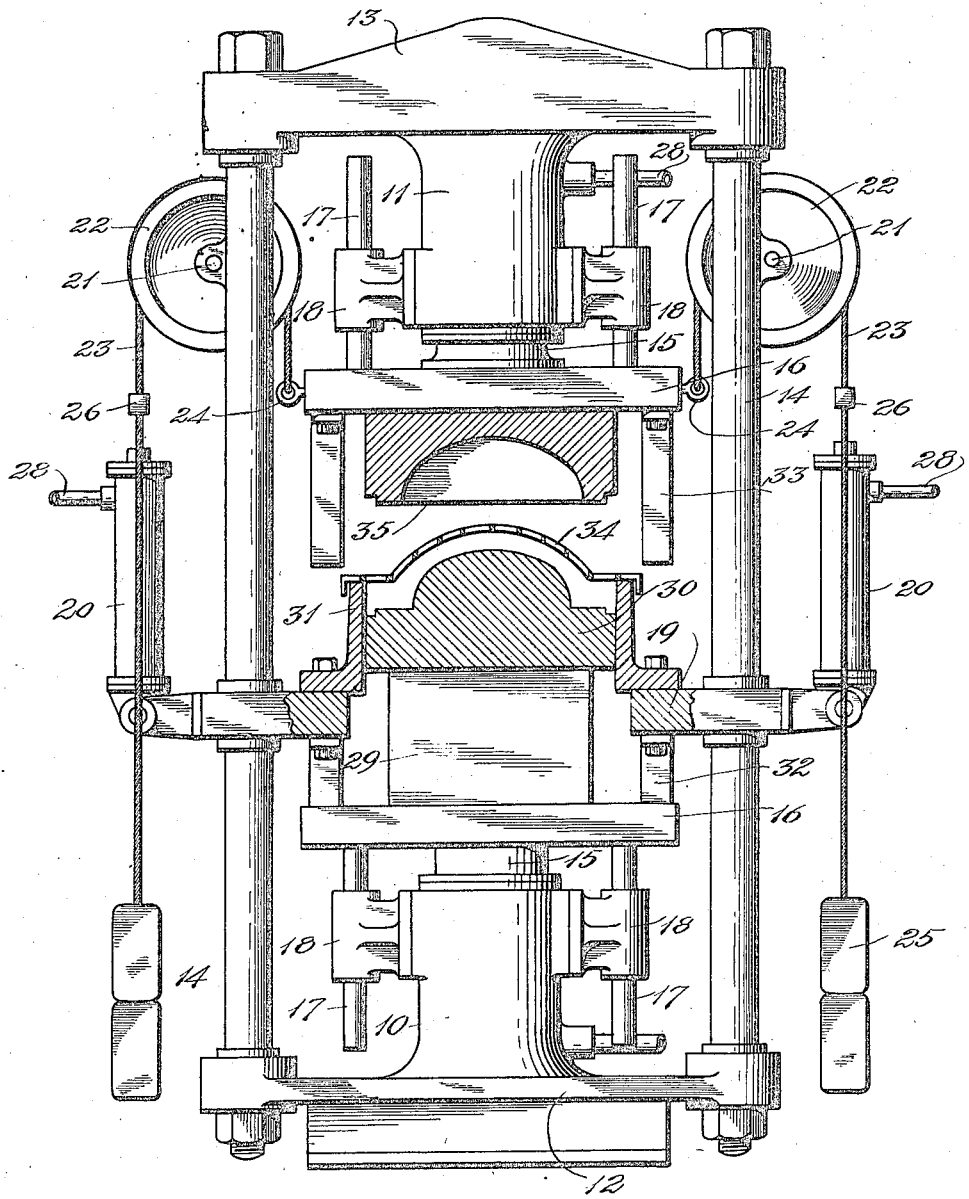
Fig. 1.
Inventor
V. E. Schmiedeknecht.
By 
Attorney

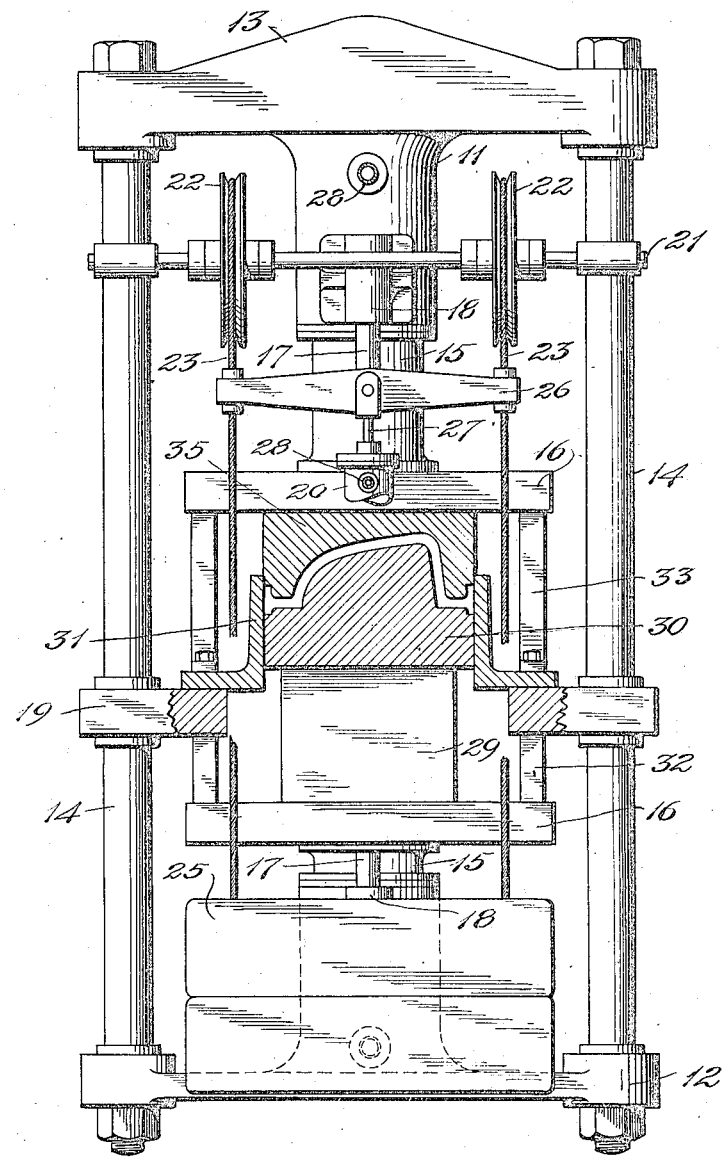

July 10, 1923.  
V. E. SCHMIEDEKNECHT  
1,461,563  
WARE MOLDING APPARATUS AND PROCESS  
Filed Oct. 13, 1922   7 Sheets-Sheet 3
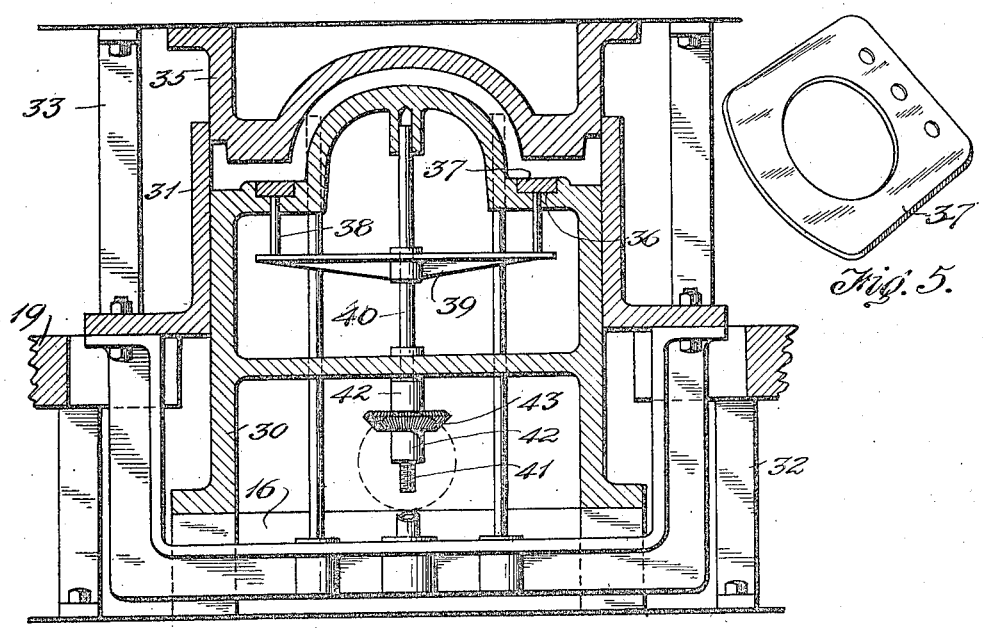
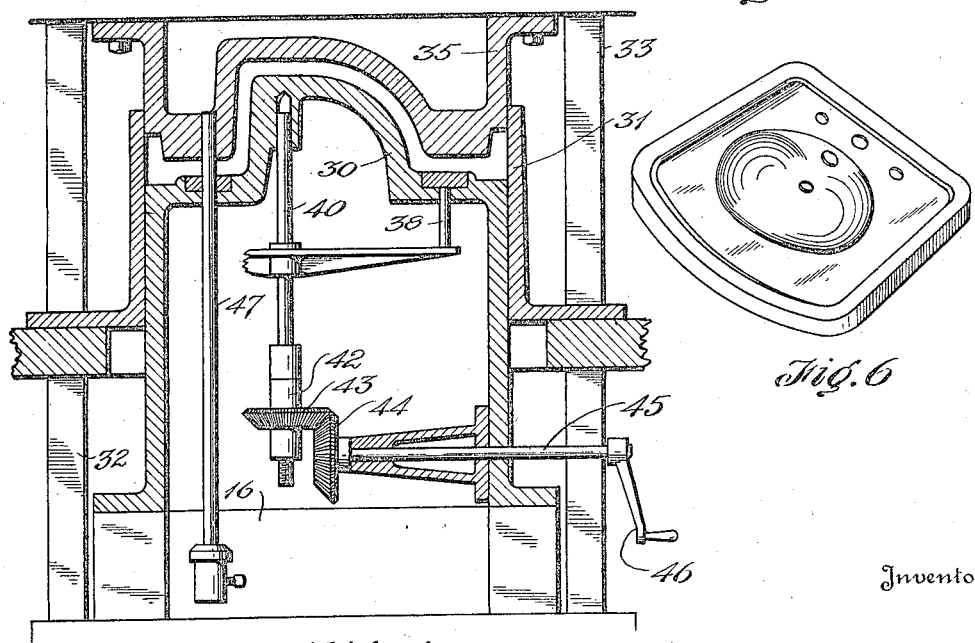
Inventor  
V. E. Schmiedeknecht,  
By  
Attorney

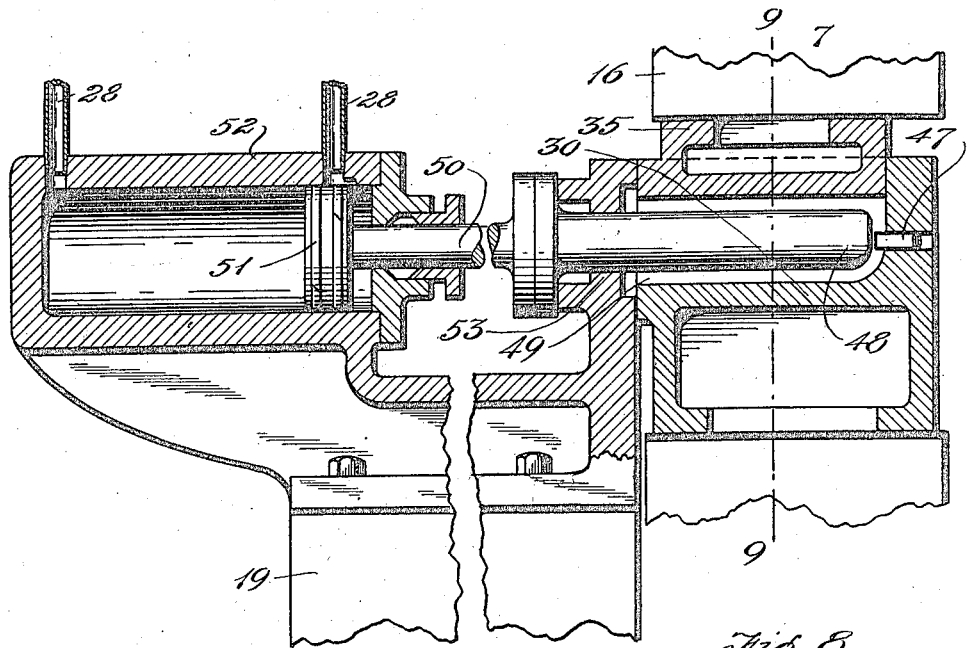
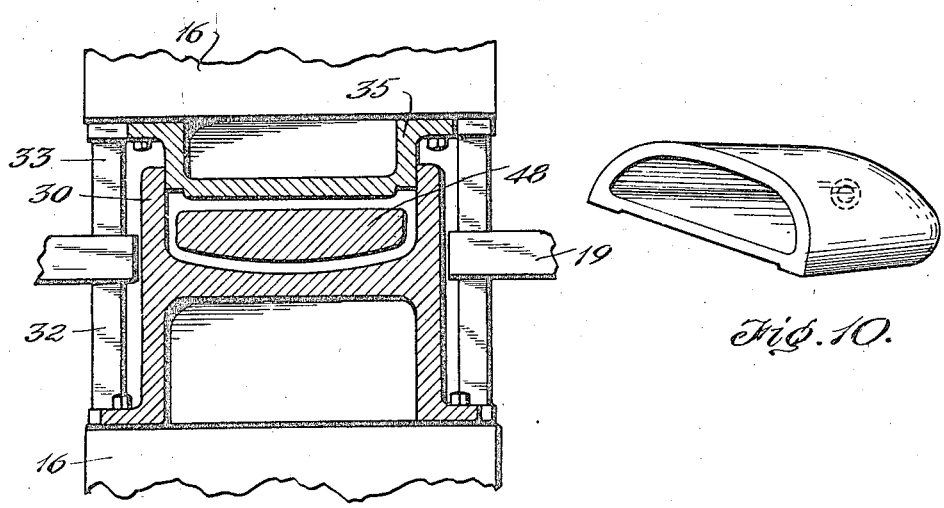

July 10, 1923.　　　　　1,461,563
V. E. SCHMIEDEKNECHT
WARE MOLDING APPARATUS AND PROCESS
Filed Oct. 13, 1922　　7 Sheets-Sheet 7

Inventor
V. E. Schmiedeknecht,
By J. A. Carksen
Attorney

Patented July 10, 1923.

1,461,563

UNITED STATES PATENT OFFICE.

VICTOR E. SCHMIEDEKNECHT, OF LOUISVILLE, KENTUCKY.

WARE-MOLDING APPARATUS AND PROCESS.

Application filed October 13, 1922. Serial No. 594,392.

*To all whom it may concern:*

Be it known that VICTOR E. SCHMIEDE-KNECHT, citizen of the United States, residing at Louisville, in the county of Jefferson and State of Kentucky, has invented certain new and useful Improvements in Ware-Molding Apparatus and Processes, of which the following is a specification.

This invention relates to the art of molding and especially to molding plastic ware.

More particularly the invention relates to molding of relatively large size articles such as sanitary ware composed of compressed clay or similar material especially of such material as is commonly known as "potters' dust", clay dust, or the like.

It has been found that in the formation of objects from such material, the material becoming coherent under pressure, it is essential that the density of the pressed object be uniform throughout its entire structure if the best results are to be obtained. In order to obtain such uniform density it has been found that it is necessary to produce pressure on both sides of the object in its formation, that is to say, an object which is formed by moving one die toward a quiescent or stationary die is not uniform in density throughout but the material nearest the stationary die, or mold, is of different density from that nearest the moving die so that both dies must move to produce the best results. In this manner the material is compressed from both directions toward the center.

Furthermore, it is imperative that the depth and distribution of the material prior to pressing should be proportional to the thickness of the pressed object at all points of its cross section. That is to say, one cannot simply heap up the loose material and depend on the dies entirely for its formation but the material must be distributed over one or the other of the dies in a thickness which is proportional to the thickness of the finished article at all points. It has been found that in order to produce the best results certain definite steps in manufacture must be followed, and that by following these steps an improved method of manufacture is established wherein the resultant finished article is of highly superior quality.

One important object of the invention is therefore to provide such an improved method of manufacturing plastic hollow ware articles.

A second important object of the invention is the provision of a novel and improved means whereby the necessary uniform density may be attained.

A third important object of the invention is to provide an improved arrangement of molding press especially adapted for the production on a commercial basis of large sized and intrically formed plastic hollow ware articles.

A fourth important object of the invention is the provision of a press of this character having certain auxiliary means of novel arrangement for regulating the thickness of the mass before molding.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:—

Figure 1 is a front elevation, partly in section, of an improved press for carrying the improved method into execution.

Figure 2 is a similar side elevation partly in section.

Figure 3 is a detail view partly in elevation and partly in section showing a modification of the press wherein provision is made for a stripper.

Figure 4 is a view of the apparatus shown in Figure 3 but taken at right angles thereto.

Figure 5 is a perspective view of the top of the stripper ring or plate.

Figure 6 is a perspective view of a finished wash basin as made on this press.

Figure 8 is a detail sectional view showing a modification of the press wherein a core plunger is employed, this form being used in the pressing of deep and narrow hollow ware articles such as flushing tanks and the like.

Figure 9 is a section on the line 9—9 of Figure 8.

Figure 10 is a perspective view of a flushing tank as molded in this device.

Figure 7:
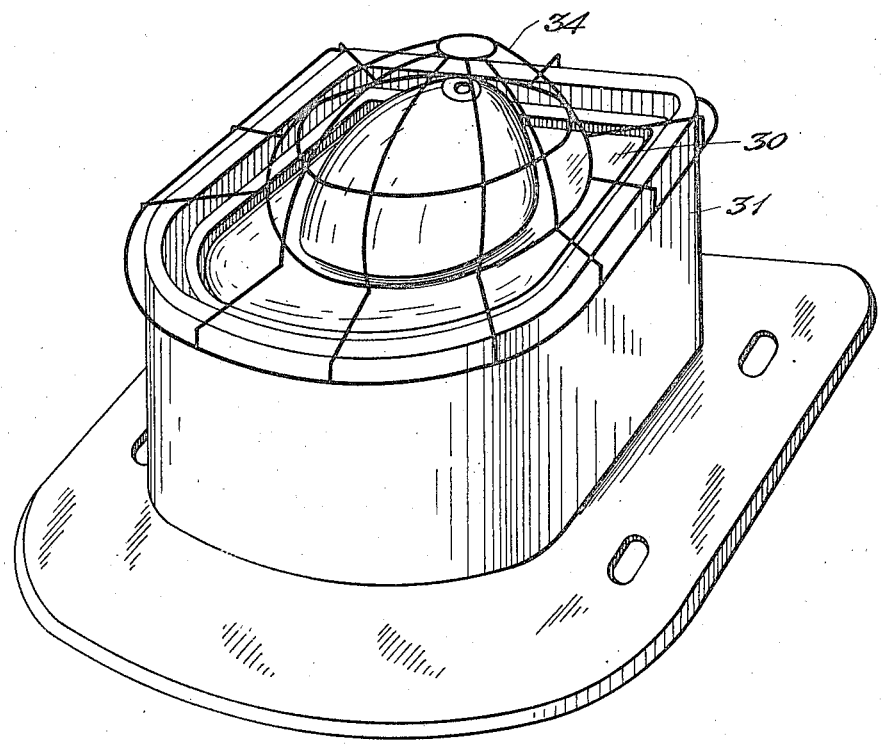
Figure 7 is an enlarged perspective view of a mold with the depth gage in position thereon.

In the construction of a press for carrying the objects of this invention into execution there is preferably employed a lower hydraulic cylinder 10 and an upper hydraulic cylinder 11. These cylinders are carried respectively by a base 12 and head or top 13. The base and top are firmly held together by suitable tie bars, or standards 14 and in each of the cylinders moves a piston 15 carrying a head 16 for the support of the respective dies. Furthermore, the heads 16 are provided with guide rods 17 which pass through guides 18 fixed to the cylinders 10 and 11. Supported intermediate the ends of the tie bars 14 is a table 19 which extends outwardly from these tie bars at each side and carries the hydraulic cylinders 20. At each side of the press there is journalled a shaft 21 whereon are respective sheaves 22 around which extend ropes 23 connected at one end to eyes 24 on the upper head 16 and at the other end to counterweights 25. These ropes 23 are connected by the cross bar or yoke 26 which is in turn connected to the piston rod 27 of the cylinder 20 at each side. The various hydraulic cylinders are supplied in the usual manner by pipes 28 and the supply and exhaust of fluid through these pipe is controlled by the ordinary type of valve not deemed necessary here to be shown. On the lower head 16 is supported a spacer 29 whereon rests the lower die 30 which is surrounded by a guard 31. Depending from the table 19 are stop lugs 32 which serve to limit the upward movement of the head 16 and consequently of the die 30. Depending from the upper head 16 are stop lugs 33 which, by their engagement by the table 19, serve to limit downward movement of this upper head and consequently of the upper die. The walls of the guard 31 project above the body of the die 30 so that they may support a sizing form or gauge 34 of reticulated material preferably of stout wire as shown in Figure 7.

Secured to the upper head 16 is the upper die 35 and it will be noted that the gauge 34 is of slightly different contour than this upper die, this being because the loose material must be proportioned in accordance with the shape of the article to be finally made and in accordance with the amount of reduction in thickness caused by the action of the dies at various points.

In some instances, as shown in Figures 3 and 4, the lower die 30 is mounted directly on the lower head 16 without interposition of the spacing block 29. Also the face of the lower die may be recessed as at 36 to receive a stripper plate 37 which is supported on pins 38 from a table 39 carried by a bar 40 having its lower end threaded as at 41. On this lower end is fitted a nut 42 carrying a bevel gear 43 wherewith meshes a bevel gear 44 fixed on a shaft 45 projecting through the side of the die 30 and provided with a crank handle 46. By this means the stripper plate 37 may be raised as the molding operation is completed to lift the article off of the die and, if desirable, this stripper plate may be used for the transportation of the molded article, but for this purpose removable from the pins. Where the articles are to have openings for water pipes and the like, cores 47 extend through the dies.

In such instances, as the manufacture of flushing tanks, the molding by the upper and lower dies 35 and 30 only effects formation of the exterior and the formation of the interior is obtained by means of a plunger core 48 movable through a lateral opening 49 in the lower die and connected to or carried by a piston rod 50. This piston rod 50 is carried by a piston 51 movable in a lateral hydraulic cylinder 52 which may be bolted to the table 19 or to an extension thereof.

Figure 11:
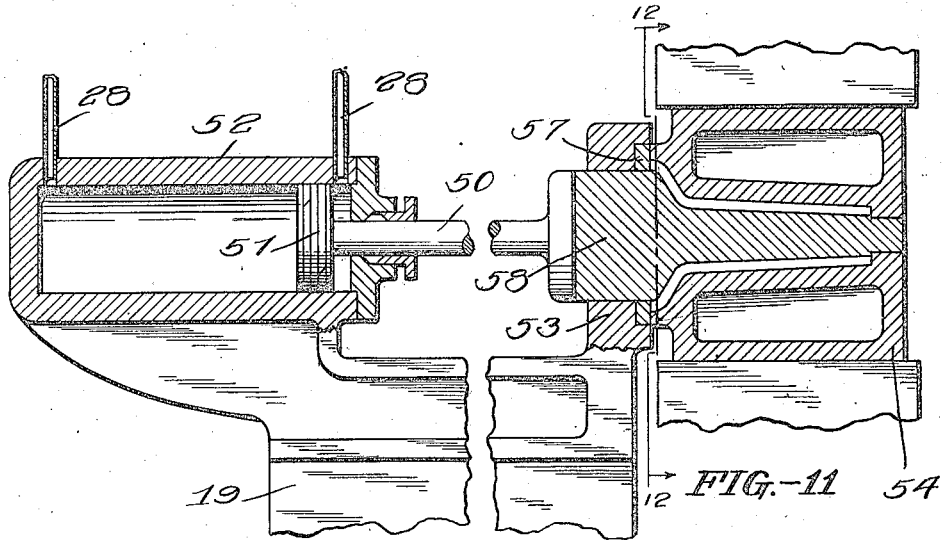
Figure 11 is a view similar to Figure 8 but showing the apparatus arranged for the molding of a hollow pedestal.
Figure 12:
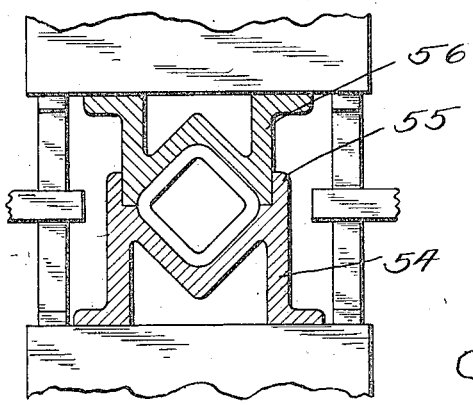
Figure 12 is a section on the line 12—12 of Figure 11.
Figure 13:
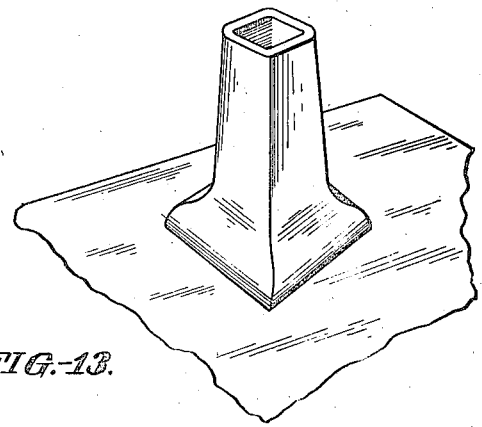
Figure 13 is a perspective view of a hollow pedestal as molded in this apparatus.
Figure 14:
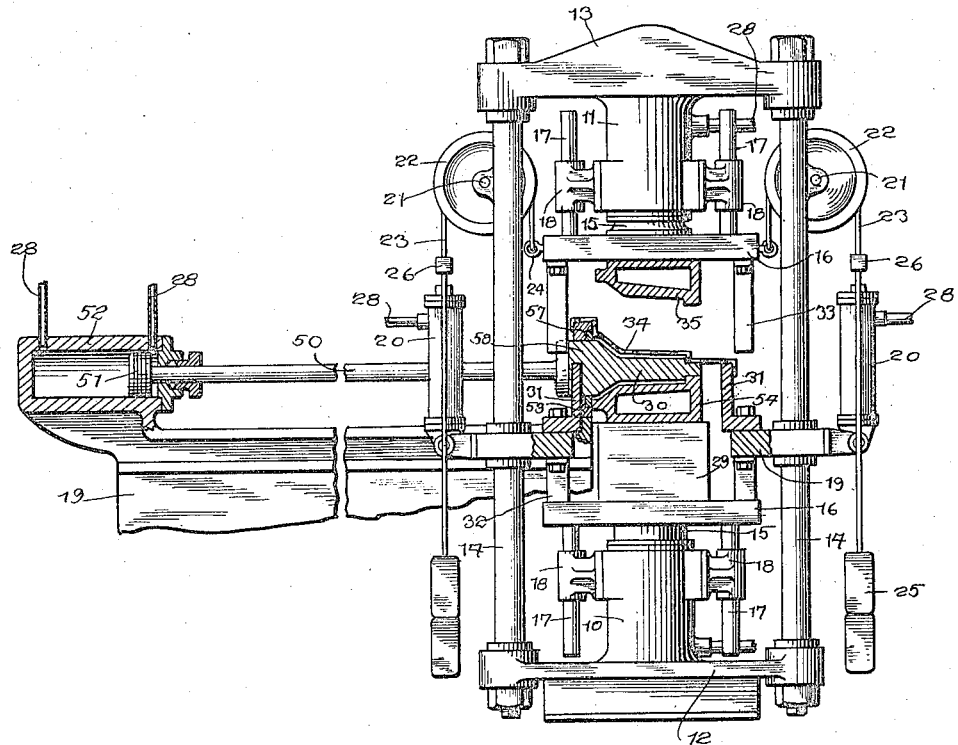
Fig. 14 is a view partly in section showing the complete machine with core forming means.

In the formation of hollow pedestals the apparatus is arranged in the manner very similar to that shown in Figures 11, 12 and 13. The changes being simply in the dies used for the purpose. In this case there is provided a lower die 54 having upstanding sides 55 between which fits the sides of an upper die 56. The molding space between these dies is of substantially rectangular form as can be clearly seen by reference to Figure 12. Furthermore, in this case the stripper plate 53 is provided with a wear plate 57 and the plunger 48 is replaced by a plunger which is substantially square in cross section this plunger being indicated at 58.

In the operation of the device the upper and lower dies are positioned as in Figure 1 and the gage 34 placed on the lower die. The prepared material containing the proper percentage of moisture is then sprinkled over the lower die through the depth of the gage or forming frame 34 and struck off evenly with the outside of this depth gage. Thus, the material ready to be pressed is of the proper contour for the operation. The depth gage is then removed and the upper die brought down on this material under a comparatively light pressure so that the material is partly compressed. The next step in the operation is to free the entrapped air and this is accomplished by releasing the pressure from the cylinder 11 and applying pressure to the cylinders 20 which raises the upper die slightly. After the release of the air low pressure is again applied to the upper die until it just seats on the partly compressed material. Next, intense pressure is applied to both the upper and lower dies so that they are forced toward each other and the pressing operation is completed bringing the elements into the relationship shown in Figure 2. Again the upper die is backed off, and where the stripper is used, the stripper is manipulated to lift the pressed object into position for removal. In such instances, as are shown in Figures 8 and 9 the material is first spread over the lower die to a depth of substantially one-half the core. The core is then inserted in position and the material distributed over the same to the proper depth as previously described. The upper and lower dies are then simultaneously pressed so that the material is packed tightly about the core from both sides. Next, the dies are opened and the core finally is withdrawn through the stripper plate 53 leaving the formed article free.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention what is claimed as new, is:—

1. That process of forming articles of plastic material which consists in spreading the material over a die through a reticulated depth gauge, striking off the excess material above the depth gauge, removing the depth gauge, bringing an upper die into contact with said material and forcing said dies toward each other.

2. That process of forming articles of plastic material which consists in spreading the material over a die through a reticulated depth gauge, striking off the excess material above the depth gauge, removing the depth gauge, bringing an upper die into contact with said material, forcing the upper die slightly toward the lower die, raising the upper die to permit the escape of entrapped air, bringing the upper die a second time down into contact with the material, and forcibly moving said upper die downward and the lower die upward.

3. An apparatus for molding plastic hollow ware comprising an upper hydraulic cylinder, a lower hydraulic cylinder, pistons operating in said cylinders, opposed dies carried by said cylinders and retractible core supporting means disposed laterally of the machine opposite the space between said dies, and a stripper carried by one of said dies and movable therewith.

4. An apparatus for molding plastic hollow ware comprising an upper hydraulic cylinder, a lower hydraulic cylinder, pistons operating in said cylinders, opposed dies carried by said cylinders, lateral hydraulic cylinders, and a laterally movable core controlled by said lateral cylinders and movable into and out of the space between said dies.

5. An apparatus for molding plastic hollow ware comprising an upper hydraulic cylinder, a lower hydraulic cylinder, pistons operating in said cylinders, opposed dies carried by said cylinders, a stripper carried by one of said dies and movable therewith, lateral hydraulic cylinders, and a laterally movable core controlled by said lateral cylinders and movable into and out of the space between said dies.

6. In a device of the kind described, the combination with a lower die, of a guard surrounding said lower die and projecting thereabove, and a reticulated depth and forming gauge adapted to be supported by said guard of said lower die.

In testimony whereof I affix my signature.

VICTOR E. SCHMIEDEKNECHT.